Figure 1:
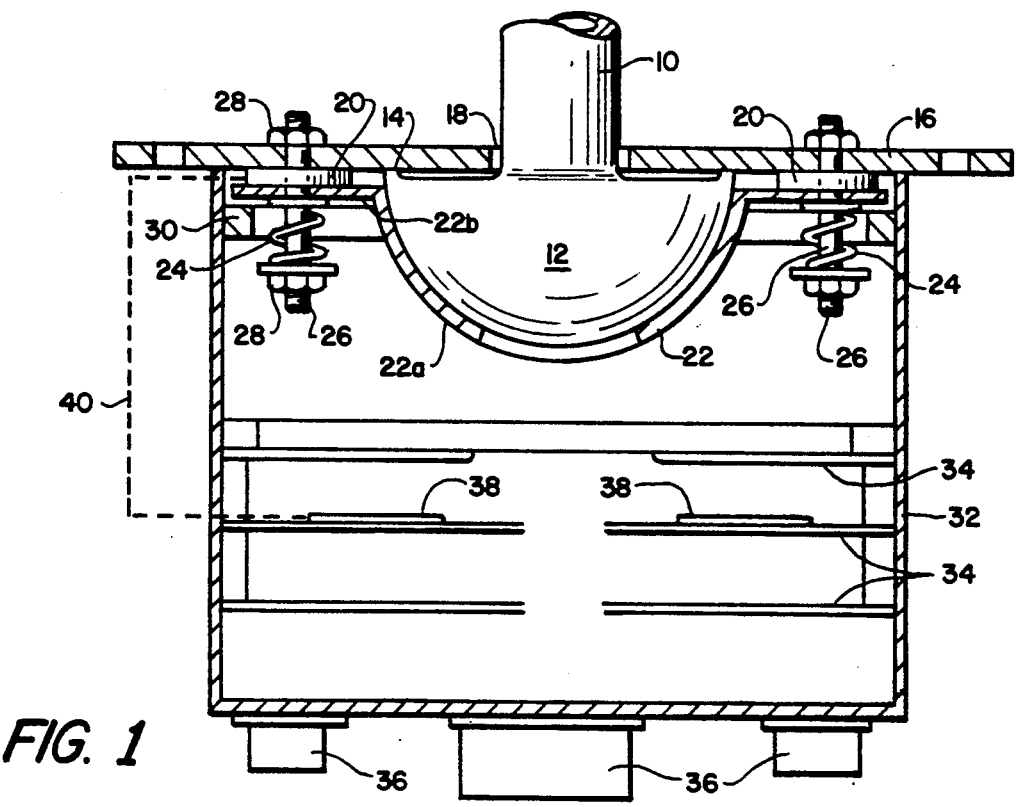

United States Patent [19]

Kaye

[11] Patent Number: 5,216,422
[45] Date of Patent: Jun. 1, 1993

[54] CONTROL MECHANISM FOR USE WITH AN OPERATOR-ACTUATED CONTROL MEMBER

[75] Inventor: Arthur Kaye, Preston, United Kingdom

[73] Assignee: British Aerospace PLC, London, United Kingdom

[21] Appl. No.: 645,653

[22] Filed: Jan. 25, 1991

[30] Foreign Application Priority Data

Jan. 25, 1990 [GB] United Kingdom ............... 9001718

[51] Int. Cl.⁵ ................... H03M 11/00; G05G 9/00; H01C 10/16
[52] U.S. Cl. ............................. 341/20; 74/471 XY; 338/128
[58] Field of Search .............. 341/20, 34; 74/471 XY; 200/6 A; 340/709, 710; 338/128; 273/148 R, 148 B

[56] References Cited

U.S. PATENT DOCUMENTS

| 3,731,013 | 5/1973 | Nightengale | 200/6 A |
| 3,779,095 | 12/1973 | Audet | 74/471 XY |
| 4,124,787 | 11/1978 | Aamoth et al. | 74/471 XY |
| 4,275,611 | 6/1981 | Asher | 338/128 |
| 4,530,376 | 7/1985 | Chatterjae | 137/636.1 |
| 4,897,629 | 1/1990 | Lecklider | 338/128 |

FOREIGN PATENT DOCUMENTS 2559305 2/1984 France .
0237013 6/1986 German Democratic Rep. .

Primary Examiner—Donald J. Yusko
Assistant Examiner—R. Gray
Attorney, Agent, or Firm—Kerkam, Stowell, Kondracki & Clarke

[57] ABSTRACT

A control mechanism for a displaceable control member such as an aircraft pilot's "joystick" includes an array of pressure transducers (20) in contact with a pressure plate (22) which in turn is in pivotal connection with the control member (10) operated by the pilot. Adjustable springs (26) bias the pressure plate (22) towards the transducers (20). Pivotal movement of the control member (10) tends to compress the springs (26) and to cause the transducers (20) to generate output signals representative of differential pressure. The signals are then processed by circuitry (34) to provide inputs to flight control computers.

7 Claims, 1 Drawing Sheet

CONTROL MECHANISM FOR USE WITH AN OPERATOR-ACTUATED CONTROL MEMBER

The present invention concerns a control mechanism for use with an operator actuated control member. Although the invention is not so restricted, it will be particularly described with reference to one possible area of application, namely an aircraft "joystick" or lever controller.

Known pilots' control levers (joysticks) are satisfactory in normal flying conditions but are less satisfactory when the aircraft flies in "high-g" conditions. In such extreme conditions it may occur, for instance, that the pilot wishing to push a control lever forwardly in fact pushes it outwardly. Moreover, in known control levers the lever centering arrangement is not capable of adjustment to the idiosyncrasies of a particular pilot.

The present invention seeks to overcome the drawbacks of known control mechanisms and to provide an arrangement in which the mechanism compensates in use for the actuation force being misdirected e.g. in extreme conditions, and in which the centering can be adjusted to suit individual operators.

According to the present invention, there is provided a control mechanism for use with a control member actuatable by an operator for generating a control output signal, comprising:

a plurality of pressure transducers arranged in a predetermined array and each effective to produce an output signal indicative of pressure;

a pressure application member in pressure-transmitting relationship with said control member;

the pressure application member being mounted to said transducers by way of biasing means for varying the pressure applied by said pressure application member in mutually opposite senses to at least two of said transducers in functional relationship with the magnitude of the force applied to the said control member; and signal processing means for processing the output signals of said at least two transducers into a control output signal.

Preferably, said pressure application member is one principal element of a ball-type joint the other principal element of which is attached to or forms part of said control member.

In a preferred embodiment, said other principal element is a part-spherical member having an annular lip constituting a fulcrum bearing against a fixed structure supporting said transducers.

The control mechanism may further include a positionally adjustable limiting member disposed so as to limit the pressure applied by said pressure application member to at least two of said transducers.

Said control member preferably has an inverted part-spherical portion in engagement with a complementarily shaped portion of said pressure application member which latter portion adjoins an annular flange of said pressure application member, said flange being biased by springs into contact with said transducers mounted on a retaining plate recessed to accommodate said part-spherical portion, whereby pivotal movement of said control member causes, in opposition to the bias of said springs, said pressure application member to disengage from said transducers.

Preferably, the ratings of each of the springs are individually adjustable e.g. by varying their length. This will compensate for a pilot not pushing his control lever in the desired direction, while giving him the necessary "feel" feedback, and the springs of the array may be "tailored" for each pilot individually.

Figure 2:
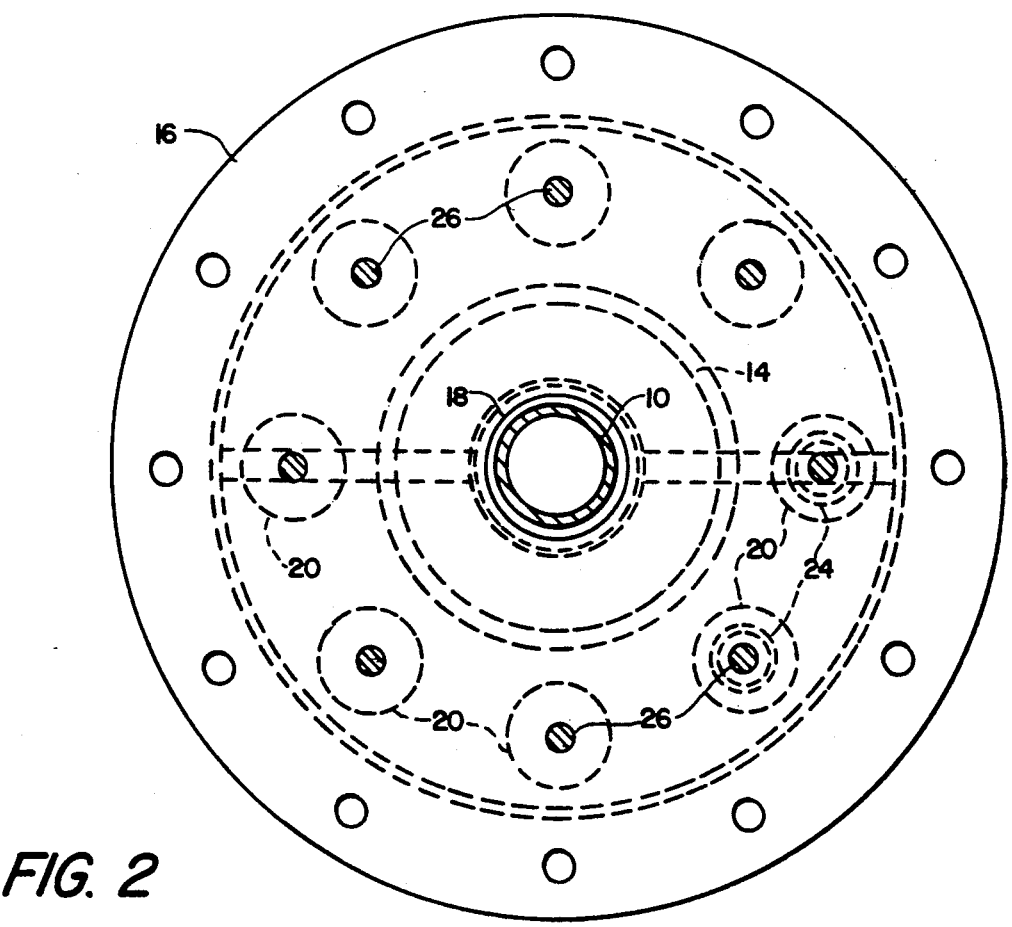

The invention is described, purely by way of example, with reference to the accompanying diagrammatic drawings, wherein:

FIG. 1 is a part-elevation, part cross-section of a control mechanism according to the invention, and FIG. 2 is a plan view of the control mechanism shown in FIG. 1.

Referring to the drawings, an aircraft pilot's "joystick" or controller has a hand grip (not shown) attached to a short column 10 which terminates in a hemispherical lower end 12 taking on the appearance of an inverted mushroom and having, at the upper edge (as viewed) of this end 12, a peripheral fulcrum lip 14. The lip 14 bears against a retaining plate 16 which is recessed at 18 to accommodate the column 10 and on which is mounted a plurality of pressure transducers (sensors) 20 arranged in a circular array. In this example, there are eight pressure sensors 20. In contact with the hemispherical lower end 12 and supporting it to the retaining plate 16 is a pressure application plate 22 which has a complementary hemispherical portion 22a and an annular flange 22b. The flange 22b is mounted directly to and seated on the pressure sensors 20 by way of a biasing force of coil springs 24. The springs 24 are each mounted on a threaded shank 26 between nuts 28, one nut 28 securing the shank 26 on the top surface (as viewed) of the retaining plate 16 while the other nut 28 supports the end of the spring 24 remote from the pressure application plate 22. Mounted below the pressure application plate 22 is an adjustable pressure limiting ring 30 which is positioned on a casing 32 such that it will limit the downward movement (as viewed) of the pressure application plate 22.

The casing 32 includes printed circuit boards 34 carrying signal processing means 38 e.g. bridge circuits electrically connected by means 40 shown schematically to the outputs of the transducers 20. Terminals and couplings 36 for electrical inputs (e.g. from a non-illustrated power supply) and outputs are provided on the external surface of the casing 32.

In operation, when a force is applied radially to the non-illustrated handle, the column 10 will pivot on the fulcrum lip 14 directly below the line of applied force. This will cause the pressure application plate 22 to lift from its seat on the pressure sensors 20 which are diametrically opposed to the pivot point. This causes the springs 24 to compress and thus the pressure on those sensors 20 to change from a positive to a negative load. The differential pressure signals produced across several sensors are passed to the circuitry on the boards 34 for processing into an output signal, e.g. a signal that may be interpreted in the above-mentioned preferred application of the invention as a demand signal to flight control computers to produce a change in aircraft attitude, such as roll or pitch.

I claim:

1. A control mechanism for use with a control member actuatable by an operator for generating a control output signal, comprising:

a fixed structure;

a plurality of pressure transducers arranged in a predetermined array supported by said fixed structure and each effective to produce an output signal indicative of pressure;

a pressure application member in pressure-transmitting relationship with said control member;

said pressure application member being one principal element of a ball and socket-type joint, the other principal element of which is attached to or forms part of said control member and is a part-spherical member having an annular lip constituting a fulcrum bearing against said fixed structure;

said pressure application member being mounted to said transducers by way of biasing means for varying the pressure applied by said pressure application member in mutually opposite senses to at least two of said transducers in functional relationship with the magnitude of the force applied to the said control member; and signal process means coupled to said transducers and effective to process the output signals of said at least two transducers into a control output signal.

2. A control mechanism according to claim 1, characterised in that a positionally adjustable limiting member is provided to limit the pressure applied by said pressure application member to at least two of said transducers.

3. A control mechanism according to claim 1, characterised in that the biasing force of said biasing means is adjustable.

4. A control mechanism according to claim 3, characterised in that a spring of adjustable rating is associated with each said transducer.

5. A control mechanism for use with a control member actuatable by an operator for generating a control output signal, comprising:

a retaining plate recessed to accommodate said control member;

a plurality of pressure transducers arranged in a predetermined array mounted on said retaining plate and each effective to produce an output signal indicative of pressure;

a pressure application member in pressure transmitting relationship with said control member, said control member having an inverted part-spherical portion in engagement with a complementarily shaped portion of said pressure application member;

said pressure application member being mounted to said transducers by way of biasing means for varying the pressure applied by said pressure application member in mutually opposite senses to at least two of said transducers in functional relationship with the magnitude of the force applied to said control member, said pressure application member having an annular flange adjoining said complementarily shaped portion, said flange being biased by springs into contact with said transducers whereby in use pivotal movement of said control member causes, in opposition to the bias of said springs, said pressure application member to disengage from said transducers; and signal processing means coupled to said transducers and effective to process the output signals of said at least two transducers into a control output signal.

6. A control mechanism according to claim 5, characterized in that the biasing force of said springs is adjustable.

7. A control mechanism according to claim 6, characterized in that a spring of adjustable rating is associated with each said transducer.

* * * * *